(12) United States Patent
Kanehiro et al.

(10) Patent No.: US 6,334,431 B1
(45) Date of Patent: Jan. 1, 2002

(54) IGNITION TIMING CONTROL SYSTEM FOR INTERNAL COMBUSTION ENGINE

(75) Inventors: Masaki Kanehiro; Naohiro Isogai, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/471,476

(22) Filed: Dec. 23, 1999

(30) Foreign Application Priority Data

Dec. 24, 1998 (JP) ............................................ 10-367824

(51) Int. Cl.$^7$ ................................................. F02P 5/15
(52) U.S. Cl. .............................. 123/406.53; 123/406.55
(58) Field of Search ........................ 123/406.53, 406.54, 123/406.55

(56) References Cited

U.S. PATENT DOCUMENTS 4,351,297 A * 9/1982 Suematsu .............. 123/406.53
4,570,596 A * 2/1986 Sato ...................... 123/406.55

FOREIGN PATENT DOCUMENTS

JP        5-69991        10/1993

* cited by examiner

Primary Examiner—Andrew M. Dolinar
(74) Attorney, Agent, or Firm—Arent Fox kintner Plotkin & Kahn, PLLC

(57) ABSTRACT

A system for controlling an ignition timing of an internal combustion engine, in which an ignition timing advancing correction amount is determined based on at least the detected engine coolant temperature, and it is determined whether the engine is under a predetermined cold starting condition. When the result is affirmative, the ignition timing is advanced beyond the MBT. This arrangement is based on the inventors finding that the gas temperature rises at the combustion stroke, but drops little after the expansion stroke. With this, the increased fuel amount for compensating the engine output loss caused by ignition timing advancement can effectively be utilized to heat the engine coolant, thereby facilitating and improving the engine warm-up.

8 Claims, 12 Drawing Sheets

IGNITION TIMING CONTROL SYSTEM FOR INTERNAL COMBUSTION ENGINE

BACKGROUND OF THE INVENTION

1. Field of the Invention

This invention relates to an ignition timing control system for an internal combustion engine, more particularly to an ignition timing control system for an internal combustion engine in which engine warm-up under cold starting is facilitated or improved.

2. Description of the Related Art

When starting an internal combustion engine, the ignition timing is conventionally retarded from the MBT (Minimum Spark advance for Best Torque) so as to facilitate or improve engine warm-up. Specifically, since the engine output drops by retarding the ignition timing from the MBT, the vehicle operator opens the throttle valve to increase the amount of fuel supply. This raises the engine coolant temperature.

On the contrary, Japanese Patent Publication No. Hei 5 (1993) 69,991 teaches advancing the ignition timing towards the MBT from a warm-up ignition timing, when the engine temperature is quite low, so as to prevent the engine output from dropping excessively. Since the combustion speed is slower at low engine coolant temperatures, this prior art proposes to advance the ignition timing towards the MBT to avoid excessive engine output decrease.

The engine coolant temperature is not always quite as low as is expected by the prior art (Hei 5 (1993)-69,901). Generally speaking, however, the engine coolant temperature at engine starting is relatively low and the combustion is slow. Accordingly, if the ignition timing is retarded at engine starting, as taught by the conventional technique, the combustion is further delayed and is apt to be degraded. For that reason, it is difficult in the conventional technique to retard the ignition timing to a sufficient extent, requiring the engine warm-up to be better facilitated or improved.

Moreover, when the ignition timing is retarded, the gas temperature drops during the combustion stroke, but rises at the expansion stroke and the exhaust stroke (which are partially overlapped with the expansion stroke). In the case that, due to spatial limitation or some similar factors, the engine does not have a sufficient engine coolant passage around the exhaust, the engine can not utilize the gas temperature rise during the expansion stroke and the exhaust stroke, in particular the exhaust stroke to a full extent. Rather, the engine is significantly affected by the lower temperature during the combustion stroke, resulting in a decrease in the quantity of heat supplied to the engine coolant.

Thus, the conventional technique is disadvantageous in that the engine can not utilize, to a full extent, the engine warming effect obtained by increasing the amount of fuel supply.

SUMMARY OF THE INVENTION

An object of the present invention is therefore to overcome the drawbacks explained in the foregoing by providing an ignition timing control system for an internal combustion engine which facilitates or improves warm-up at engine starting, even when the engine does not have a sufficient engine coolant passage around the exhaust port due to spatial limitation.

This invention achieves these objects by providing a system for controlling an ignition timing of an internal combustion engine, including: engine operating condition detecting means for detecting operating conditions of the engine including at least an engine speed, an engine load and an engine coolant temperature; basic ignition timing determining means for determining a basic ignition timing from mapped data prepared based on MBT using the detected engine speed and the engine load; output ignition timing determining means for determining an output ignition timing based at least on the determined basic ignition timing; and ignition means for igniting an air-fuel mixture in a cylinder of the engine; wherein the system includes:advancing correction amount determining means for determining an ignition timing advancing correction amount based on at least the detected engine coolant temperature; and engine cold start determining means for determining whether the engine is under a predetermined cold starting condition based on the detected operating conditions of the engine;

BRIEF EXPLANATION OF THE DRAWINGS

This and other objects and advantages of the invention will be more apparent from the following description and drawings, in which.

DETAILED DESCRIPTION OF THE PREFERRED EMBODIMENT

An embodiment of the present invention will now be explained with reference to the drawings.

Figure 1:
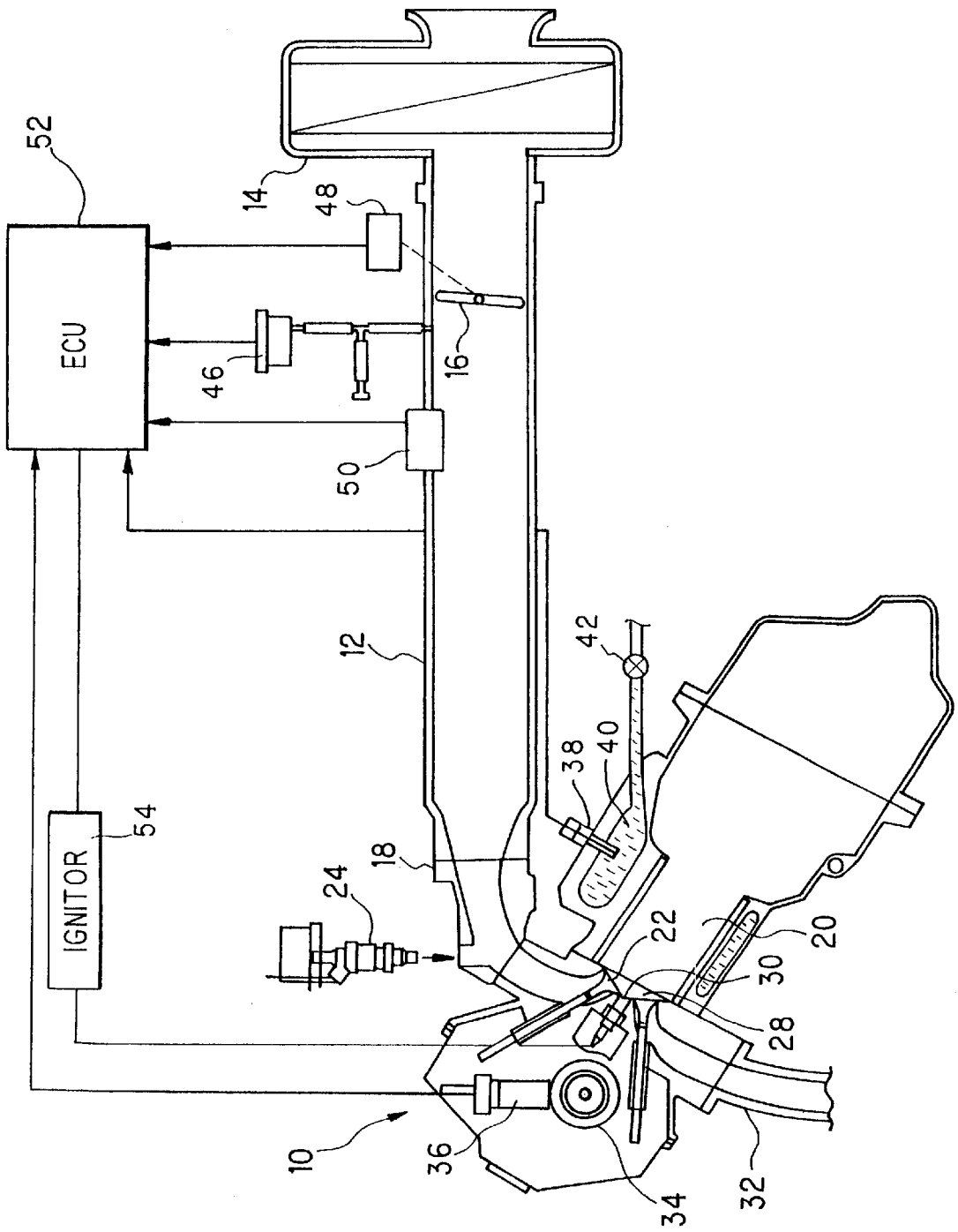
FIG. 1 is an overall schematic view showing an ignition timing control system for an internal combustion engine according to an embodiment of the invention.

FIG. 1 is an overall schematic view of an ignition timing control system for an internal combustion engine according to an embodiment of the invention.

Reference numeral 10 in this figure designates a main unit of an OHC in-line four-cylinder internal combustion engine main unit (hereinafter called simply "engine"). Air drawn into an air intake pipe 12 through an air cleaner 14 mounted on its far end flows through an intake manifold 18, while the flow thereof is adjusted by a throttle valve 16, to an intake valve 22 of respective cylinders 20 (for brevity of illustration, only one is shown in the figure).

A fuel injector 24 is installed at a position upstream of the intake valve 22 of each cylinder 20 and injects pressurized fuel supplied from a fuel supply system (not shown). The injected fuel mixes with the intake air to form an air-fuel mixture that flows into a combustion chamber 28 of each cylinder 20 when the intake valve 22 is open and is ignited by a spark generated by a spark plug 30 in the order of the first, the third, the fourth and the second cylinder. The resulting combustion of the air-fuel mixture drives down a piston (not shown) to rotate the crankshaft.

The exhaust gas produced by the combustion is discharged through an exhaust valve (not shown) into an exhaust manifold 32, from where it passes through an exhaust pipe (not shown) to a catalytic converter (not shown) to be purified and then discharged to the exterior.

A crank angle sensor 36 is installed in the vicinity of the camshaft 34 of the engine main unit 10 and outputs a signal representing the piston crank angles. A coolant temperature sensor 38 is installed in an engine coolant passage 40 formed in the cylinder block in the proximity of the cylinder 20 and outputs a signal representing the engine coolant temperature TW. When the engine coolant temperature TW is higher than a preset value of a thermostat (valve) 42, the thermostat (valve) 42 is opened such that the engine coolant flows into a radiator (not shown) to circulate there to be cooled and returns to the engine 10.

A manifold absolute pressure sensor 46 is provided in the air intake pipe 12 downstream of the throttle valve 16 and outputs a signal representing the absolute manifold pressure (indicative of engine load) PBA. A throttle position sensor 48 is connected to the throttle valve 16 and outputs a signal representing the opening of the throttle valve 16 (throttle opening θ TH). An intake air temperature 50 is provided at an appropriate location of the intake pipe 12 and outputs a signal indicative of the temperature TA of intake air sucked into the engine 10.

The outputs of the sensors are sent to an ECU (Electronic Control Unit) 52. The ECU 52 comprises a microcomputer having a CUP, a ROM, a RAM (all not shown), etc. The output of the crank angle sensor 36 is counted by a counter (not shown) in the ECU 52 and the engine speed NE is determined or calculated.

In the ECU 52, the CPU retrieves a basic ignition timing from mapped data using the detected engine speed NE and the manifold absolute pressure PBA and corrects the basic ignition timing based on the detected engine coolant temperature TW, etc., and determines an output ignition timing, as will be explained later. Then, the CPU sends the output ignition timing to an ignitor 54, via an output circuit and driver (neither shown) such that the spark plug 30 generates a spark at crank angles corresponding to the output ignition timing to ignite the air-fuel mixture in the order of the first, the third, the fourth and the second cylinder.

This operation of the ignition timing control system for an internal combustion engine according to this embodiment will now be explained.

Figure 2:
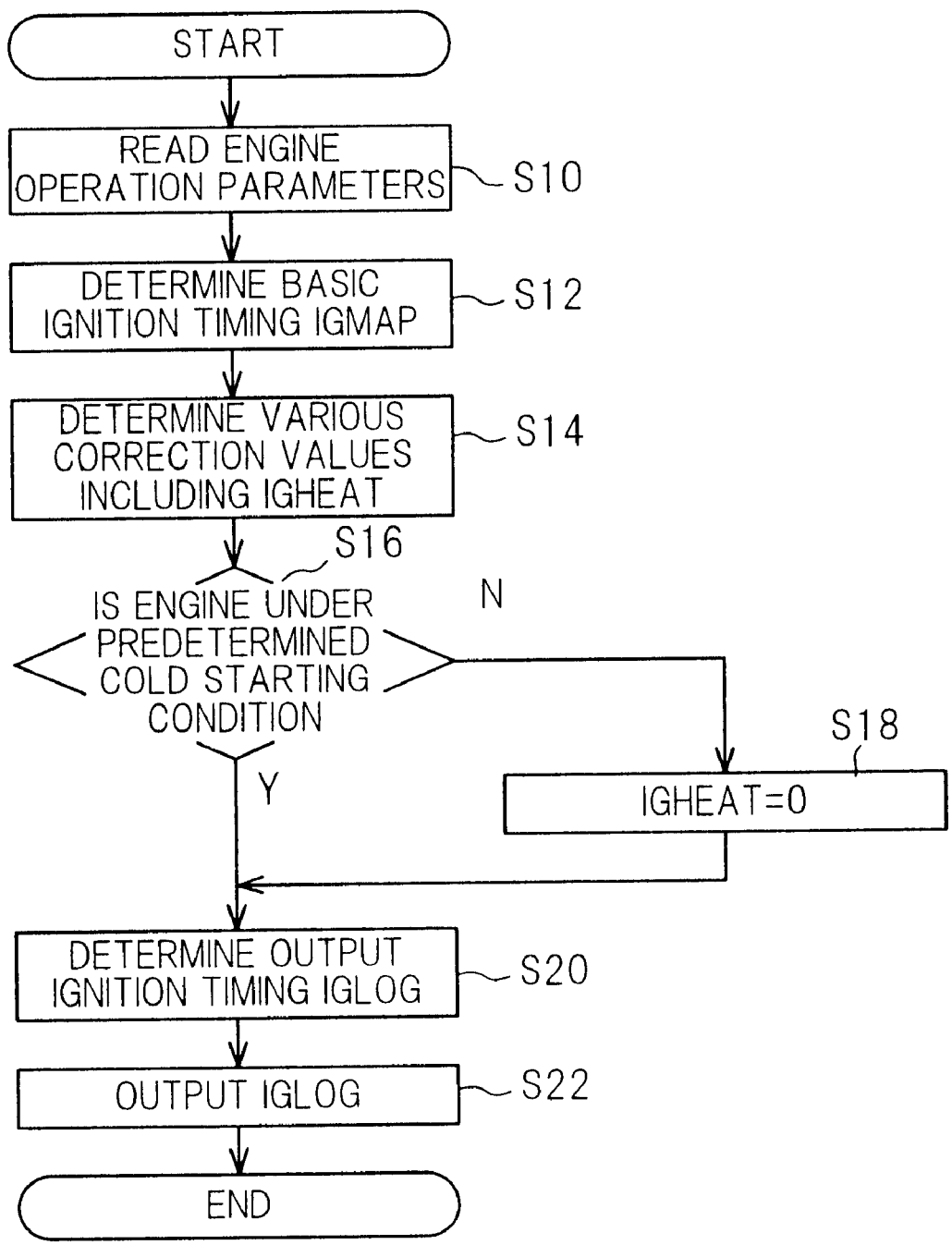
FIG. 2 is a flow chart showing the operation of the system illustrated in FIG. 1.

FIG. 2 is a flow chart showing the operation of the system. The program according to this flow chart is executed at prescribed crank angles such as at BTDC (Before Top Dead Center) 15 degrees.

The program begins in S10 in which the parameters indicative of the operation of the engine 10 including the engine speed NE, the manifold absolute pressure PBA, the engine coolant temperature TW, the intake air temperature TA are read. The program then proceeds to S12 in which the basic ignition timing (hereinafter referred to as "IGMAP") is retrieved from the mapped data (whose characteristics are not shown) using the engine speed NE and the manifold absolute pressure PBA as address data. The mapped data are predetermined based on the aforesaid MBT such that basic ignition timing is determined at or in the proximity of the MBT.

The program then proceeds to S14 in which various correction values including a warm-up advancing correction amount (hereinafter referred to as "IGHEAT") are determined or calculated.

Explaining the determination of the ignition timing in this embodiment, the output ignition timing (hereinafter referred to as "IGLOG") is determined or calculated as follows.

IGLOG=IGMAP×IGTW+IGTA+IGHEAT×KADTW×KADTA× KADNE×KADPB wherein, IGTW is an engine-coolant-temperature correction amount and IGTA is an intake-air-temperature correction amount. IGTA and IGTA are correction amounts to be added to the basic ignition timing IGMAP. And the others are correction factors to be multiplied by IGHEAT to correct the same. The others are, KADTW: engine-coolant-temperature-warm-up correction factor; KADTA: intake-air-temperature-warm-up correction factor; KADNE: engine-speed-warm-up correction factor; and KADPB: manifold-absolute-pressure-warm-up correction factor.

Figure 3:
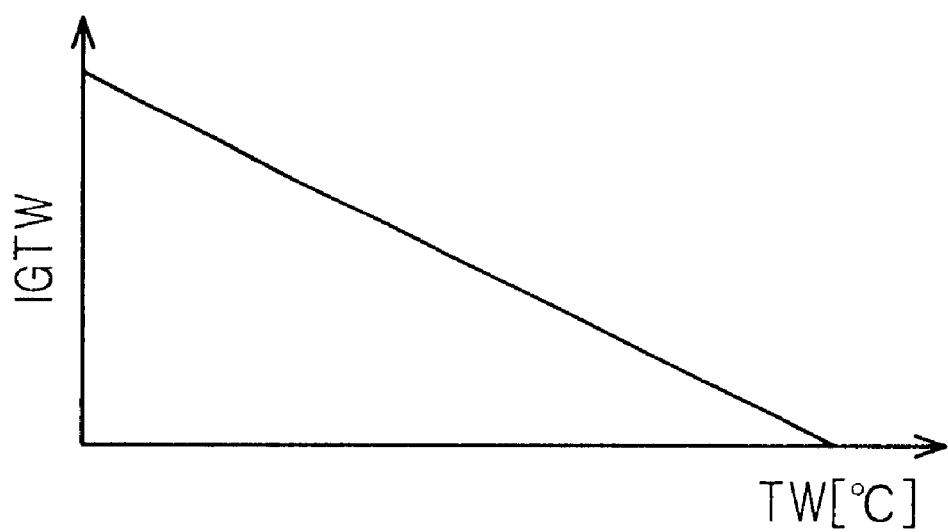
FIG. 3 is an explanatory graph showing the characteristic of an engine-coolant-temperature correction amount IGTW referred to in the flow chart of FIG. 2.
Figure 4:
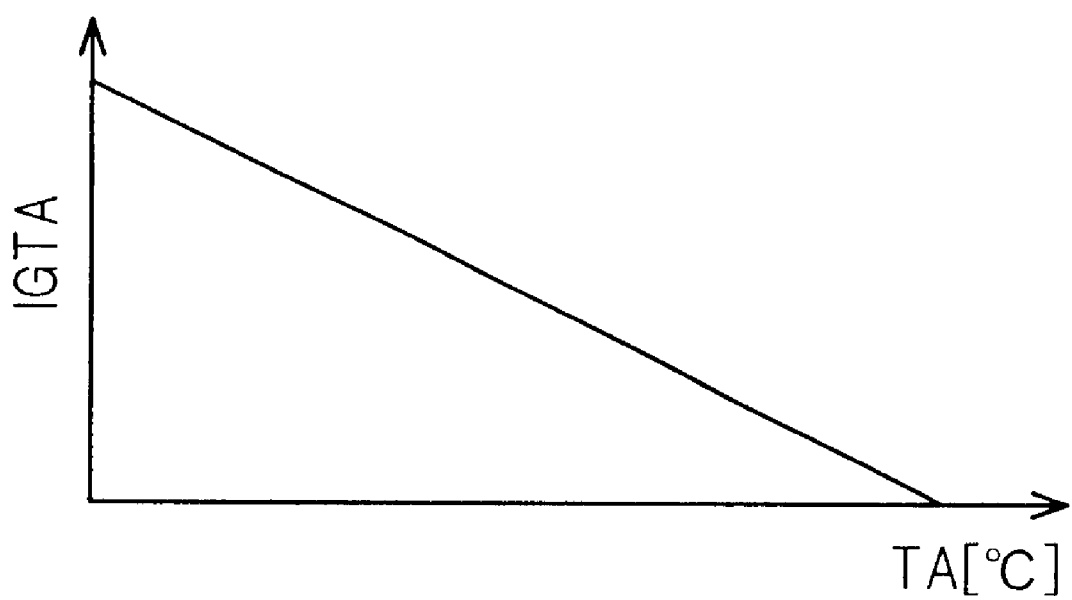
FIG. 4 is an explanatory graph showing the characteristic of a warm-up advancing correction amount IGTA referred to in the flow chart of FIG. 2.

As illustrated in FIG. 3, the engine-coolant-temperature correction amount IGTW is set with respect to the engine coolant temperature TW in such a way that it decreases with increasing TW. As illustrated in FIG. 4, the intake-air-temperature correction amount IGTA is set with respect to the intake air temperature TA in such a way that it decreases with increasing TA.

Figure 5:
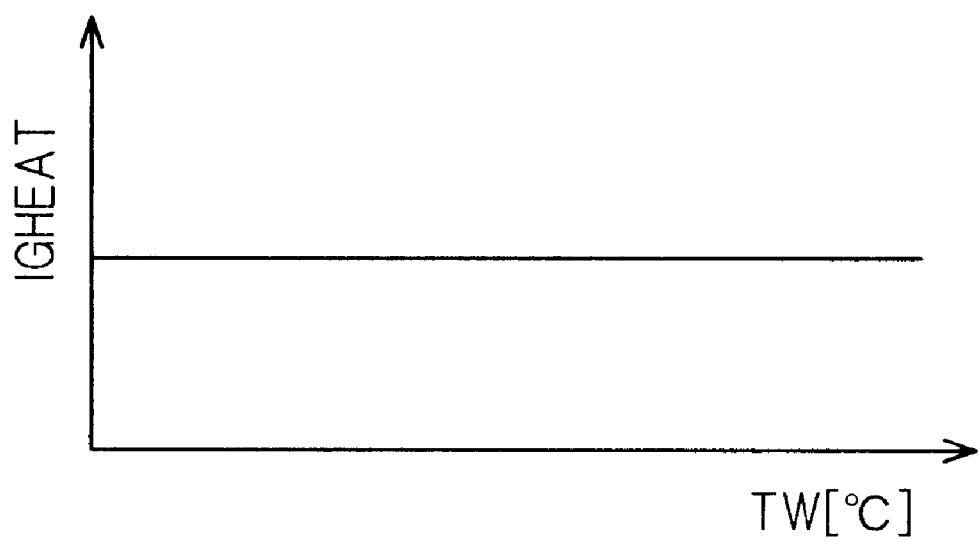
FIG. 5 is an explanatory graph showing the characteristic of an engine-coolant-temperature correction amount IGHEAT referred to in the flow chart of FIG. 2.

The warm-up advancing correction amount IGHEAT is a value determined to facilitate or improve the engine warm-up and, as shown in FIG. 5, is set to be constant with respect to the engine coolant temperature TW. More specifically, the factor IGHEAT is a correction amount set beyond the MBT in the advancing direction and is set to a fixed amount such as 30 degrees from the MBT in the advancing direction.

Figure 6:
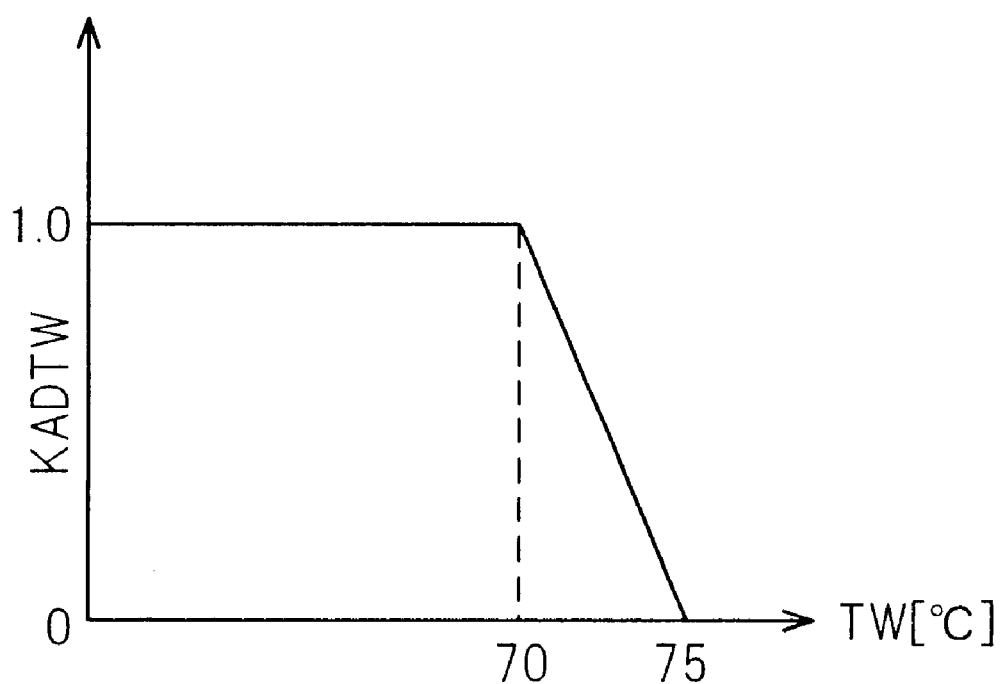
FIG. 6 is an explanatory graph showing the characteristic of an engine-coolant-temperature-warm-up correction factor KADTW to be multiplied by IGHEAT referred to in the flow chart of FIG. 2.
Figure 7:
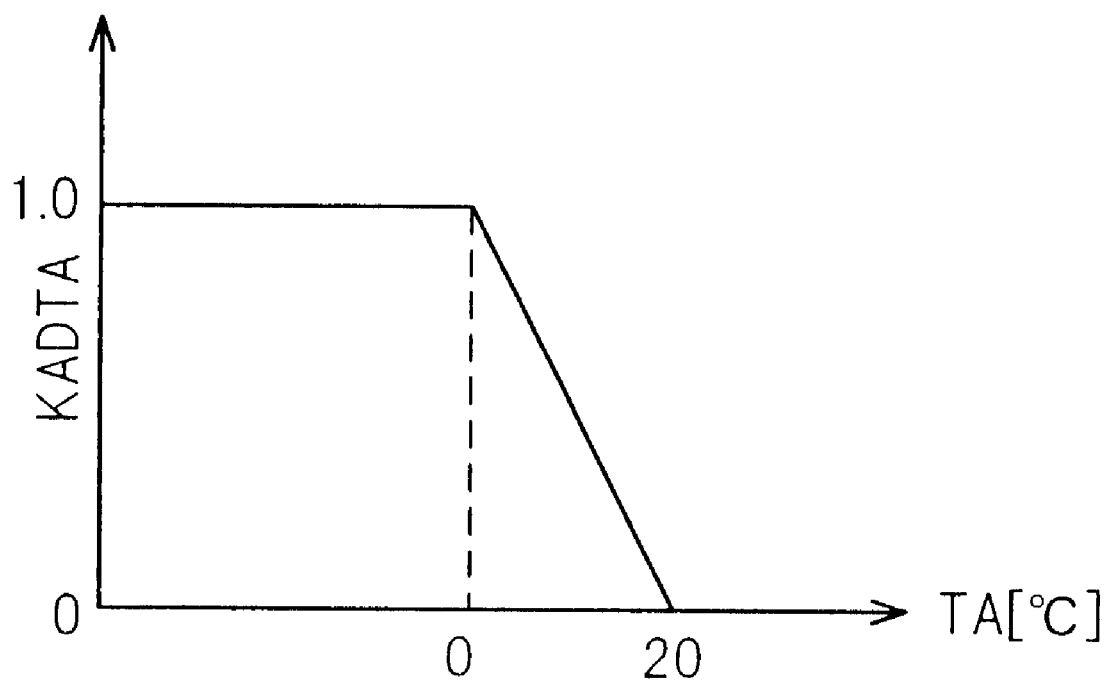
FIG. 7 is an explanatory graph showing the characteristic of an intake-air-temperature-warm-up correction factor KADTA to be multiplied by IGHEAT referred to in the flow chart of FIG. 2.

As illustrated in FIG. 6, the engine-coolant-temperature warm-up correction factor KADTW is set with respect to the engine coolant temperature TW in such a manner that it is constant until 70° C. It then decreases sharply and becomes zero at or above 75° C. As illustrated in FIG. 7, the intake-air-temperature warm-up correction factor KADTA is set with respect to the engine coolant temperature TA in such a manner that it is constant until 0° C. It then decreases sharply and becomes zero at or above 20° C.

Figure 8:
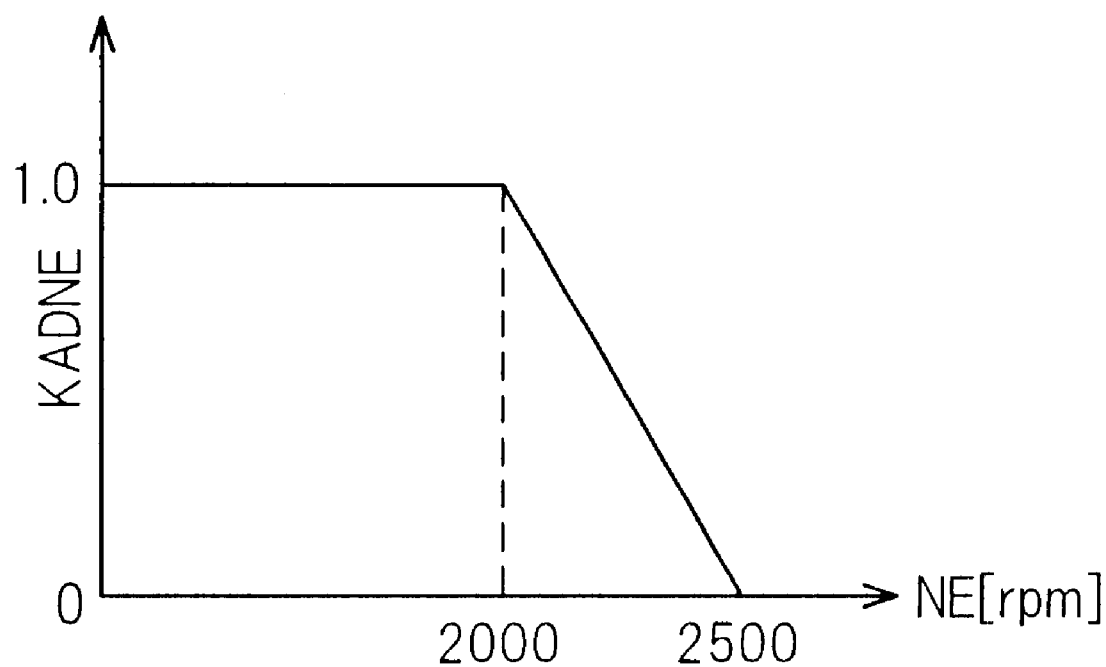
FIG. 8 is an explanatory graph showing the characteristic of an engine-speed-warm-up correction factor KADNE to be multiplied by IGHEAT referred to in the flow chart of FIG. 2.
Figure 9:
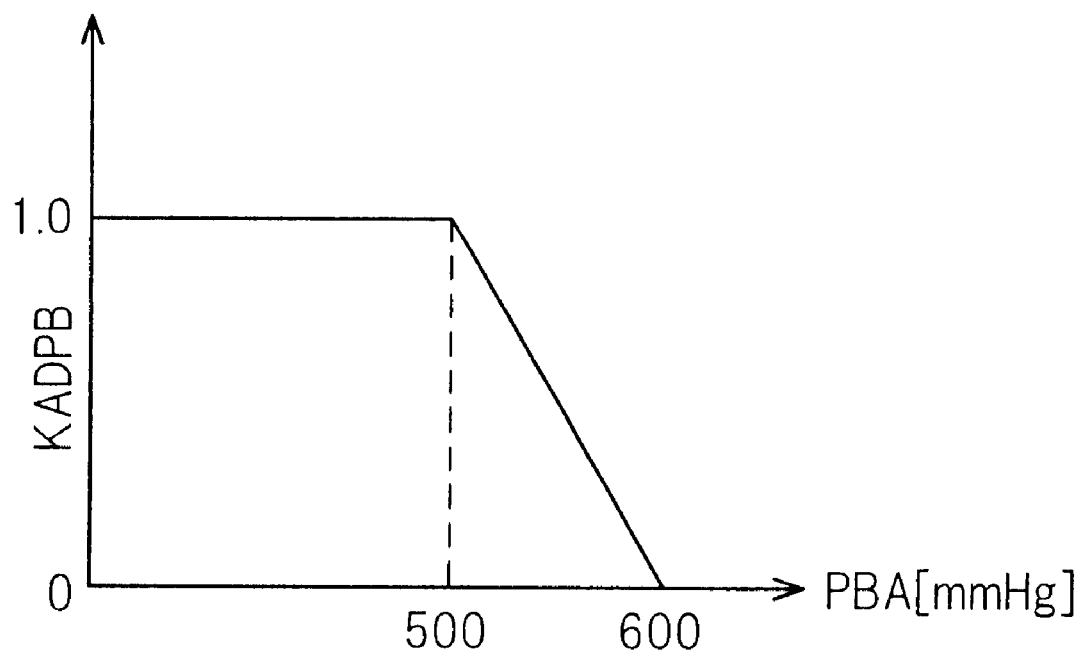
FIG. 9 is an explanatory graph showing the characteristic of a manifold-absolute-pressure-warm-up correction factor KADPB to be multiplied by IGHEAT referred to in the flow chart of FIG. 2.

As illustrated in FIG. 8, the engine-speed-warm-up correction factor KADNE is set with respect to the engine speed NE in such a manner that it is constant until 2000 rpm. It then decreases sharply and becomes zero at 2500 rpm. As illustrated in FIG. 9, the manifold-absolute-pressure-warm-up correction factor KADPB is set with respect to the manifold absolute pressure PBA in such a manner that it is constant until 500 mmHg. It then decreases sharply and becomes zero at 600 mmHg.

Thus, these correction factors are multiplied by IGHEAT to correct the same such that the ignition timing advancing amount increases with decreasing engine coolant temperature TW.

Returning to the explanation of FIG. 2, the program then proceeds to S16 in which it is determined whether the engine 10 is under a predetermined cold starting condition.

Specifically, this is done by determining whether the detected engine speed NE is within a range defined by appropriately set upper and lower limits, whether the detected manifold absolute pressure PBA is within a range defined by appropriately set upper and lower limits, and whether the detected engine coolant temperature TW is within a range defined by appropriately set upper and lower limits. When the results in these determinations are all affirmative, it is then determined that the engine 10 is under the predetermined cold starting condition.

It is alternatively possible to provide a vehicle speed sensor and make additional determination whether the detected vehicle speed is within a range defined by appropriately set upper and lower limits such that, when the results in the determinations including this additional one are all affirmative, it is determined that the engine 10 is under the predetermined cold starting condition.

When the result is affirmative, since this indicates no advancing correction is needed, the program proceeds to S18 in which the warm-up advancing correction amount IGHEAT is reset to zero.

The program then proceeds to S20 in which the output ignition timing IGLOG is determined or calculated in the manner mentioned above. Unless the result in S16 is negative, the output ignition timing IGLOG is set at crank angles beyond the MBT in the advancing direction by at least 5 degrees such as 10 or 20 degrees.

The program then proceeds to S22 in which the determined output ignition timing IGLOG is output such that the ignition is conducted by the ignitor 54 and the spark plug at crank angles corresponding to the output ignition timing IGLOG.

This operation will again be explained with reference to FIGS. 10 and 11.

Figure 10:
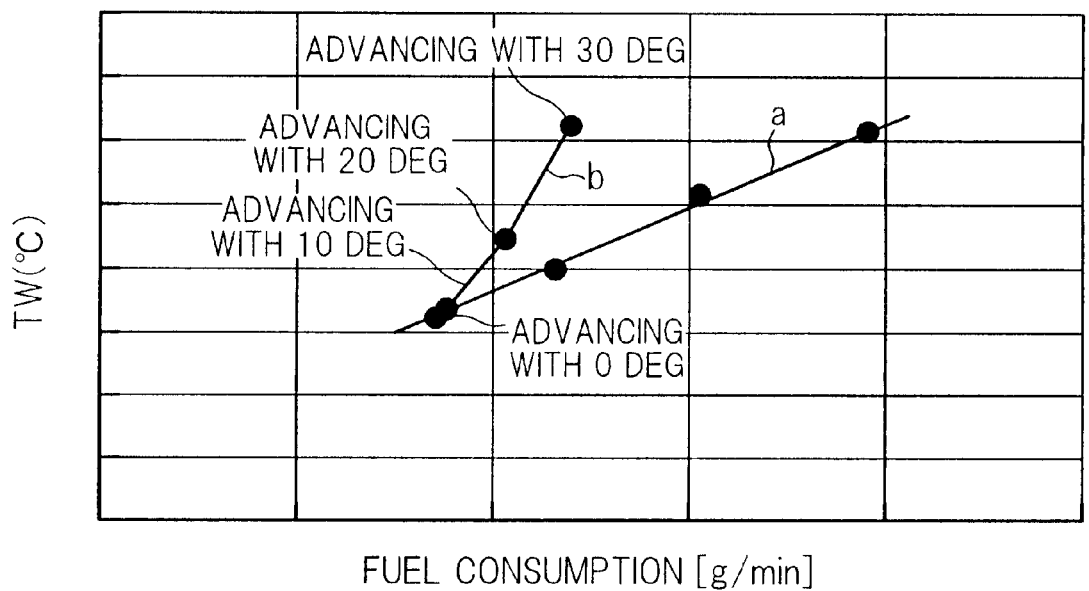
FIG. 10 is an explanatory graph showing the test result conduced by the inventors illustrating a characteristic of fuel consumption (engine load) relative to the engine coolant temperature TW, etc.
Figure 11:
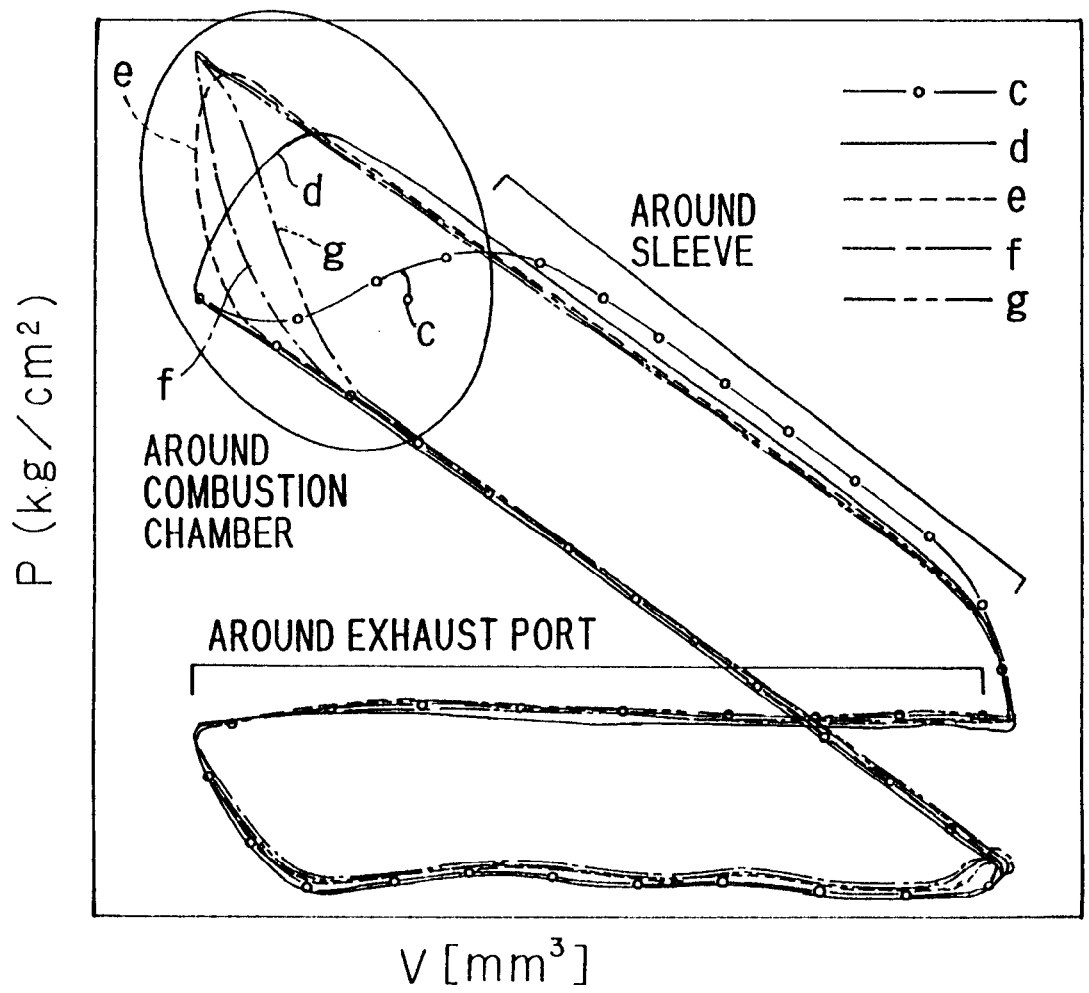
FIG. 11 is an explanatory graph similarly showing the test result conducted by the inventors illustrating the p-v diagram.

FIGS. 10 and 11 are graphs showing the test data conducted by the inventors. In FIG. 10, a characteristic marked by "a" indicates the fuel consumption or supply (i.e., the engine load) relative to the engine coolant temperature TW (at a situation before the thermostat (valve) 42 is open when the detected intake air temperature TA is quite low). As illustrated, the engine coolant temperature TW rises or increases with increasing engine load. Another characteristic marked by "b" indicates ignition timing advancing characteristic during vehicle cruising at 40 km/h in which the engine operation is stable. As illustrated, the engine coolant temperature TW rises with increasing ignition timing advance.

Since the engine output drops as the ignition timing is advanced beyond the MBT (based on which the basic ignition timing is set), the amount of fuel consumption (or supply) should be increased so as to keep the cruising speed at 40 km/h. Although, the amount of fuel consumption (or supply) is increased in order to keep the cruising speed at 40 km/h, as is understood from the figure, the engine coolant temperature rise due to the ignition timing advance has a great effect in facilitating or improving the engine warm-up, as will be explained below. The present invention was made based on this finding.

This will now be explained with reference to FIG. 11.

FIG. 11 is a graph showing the p-v diagram on the condition that the same amount of fuel is supplied. In the figure, the lines "c" to "g" indicate characteristics where the ignition timing is advanced from the MBT by different amounts. Specifically, the line "c" indicates the characteristic obtained by 0 degree advancement, the line "d" indicates that obtained by 10 degrees advancement, the line "e" indicates that obtained by 20 degrees advancement, the line "f" indicates that obtained by 30 degrees advancement and line "g" indicates that obtained by 40 degrees advancement.

As the ignition timing is advanced, since the combustion stroke begins early and the in-cylinder pressure P rises early at the end of the straight portion of the compression stroke, the maximum in-cylinder pressure Pmax increases.

Insofar as the inventors noted, the maximum in-cylinder pressure increased until approximately 20 degrees beyond the MBT, but the pressure change became little after 30 degrees or more. It was also found that the pressure after expansion tended to decrease until 20 degrees advancement, but the pressure change became little thereafter. The MBT at this condition, determined through another test, was BTDC 15 degrees.

Replacing the pressure with temperature, the above will be concluded as follows.

The ignition timing advancing up to the MBT or thereabout (i.e., the usual ignition timing advancement) can raise temperature around the combustion chamber 28 of the cylinder 20. However, since the temperature drops after the expansion stroke, the usual advancement merely changes the distribution of heat to heat the engine coolant. In other words, the total heat quantity to be supplied to the engine coolant remains unchanged.

However, when the ignition timing is advanced beyond the MBT, the gas temperature rises by the amount obtained during the combustion stroke, but the temperature drop after the expansion stroke is relatively small, thereby increasing the total quantity of heat to be supplied to the engine coolant.

Thus, by advancing the ignition timing beyond the MBT, the heat quantity increase due to the fuel supply amount increase (to compensate the engine output loss caused by this ignition timing advancement) can effectively be utilized to warm the engine coolant temperature.

Figure 12:
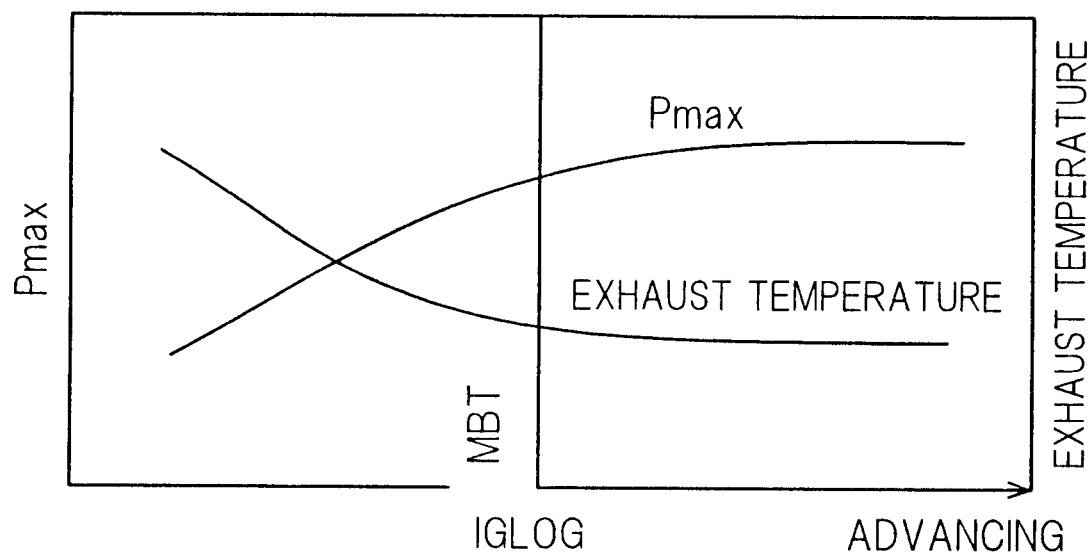
FIG. 12 is an explanatory graph showing the effect obtained by the system according to the embodiment of the present invention.

In other words, the ignition timing is further advanced from the point where the combustion is almost completed at or before the TDC. More specifically, as shown in FIG. 12, the difference between temperature corresponding to the maximum in cylinder pressure Pmax and the exhaust temperature can thus been utilized effectively.

Having been configured in the foregoing manner, the ignition timing control system according to this embodiment can facilitate and improve engine warm-up. Moreover, since the heat exchange around the combustion chamber is mainly utilized, the system is effective for an engine which, due to the engine design, can not have a sufficient engine coolant passage near the exhaust port.

This embodiment is thus configured to have a system for controlling an ignition timing of an internal combustion engine (10), including: engine operating condition detecting means (crank angle sensor 36, manifold absolute sensor 46, coolant temperature sensor 38, intake air temperature sensor 50, ECU 52, S10) for detecting operating conditions of the engine including at least an engine speed (NE), an engine load (PBA) and an engine coolant temperature (TW); basic ignition timing determining means (ECU 52, S12) for determining a basic ignition timing (IGMAP) from mapped data prepared based on MBT using the detected engine speed and the engine load; output ignition timing determining means (ECU 52, S20) for determining an output ignition timing (IGLOG) based at least on the determined basic ignition timing; and ignition means (ignitor 54, spark plug 30, ECU 52, S22) for igniting an air-fuel mixture in a cylinder of the engine. The system includes: advancing correction amount determining means (ECU 52, S14) for determining an ignition timing advancing correction amount (warm-up advancing correction amount IGHEAT) based on at least the detected engine coolant temperature (TW); and engine cold start determining means (ECU 52, S16) for determining whether the engine is under a predetermined cold starting condition based on the detected operating conditions of the engine; and wherein the output ignition timing determining means determines the output ignition timing beyond the MBT based on the determined ignition timing advancing correction amount, when the engine is under the predetermined cold starting condition.

In the system, the advancing correction amount determining means determines the ignition timing advancing correction amount based on the engine coolant temperature (TW), the engine speed (NE) and the engine load (PBA).

In the system, the advancing correction amount determining means determines the ignition timing advancing correction amount based on the engine coolant temperature, the engine speed, the engine load and an intake air temperature (TA).

In the system, the advancing correction amount determining means determines the ignition timing advancing correction amount constant with respect to the engine coolant temperature which varies relative to the engine speed and the engine load such that the ignition timing advancing correction amount basically increases with decreasing engine coolant temperature.

In the system, the advancing correction amount determining means determines the ignition timing advancing correction amount constant with respect to the engine coolant temperature which varies relative to the engine speed, the engine load and the intake air temperature such that the ignition timing advancing correction amount basically increases with decreasing engine coolant temperature.

It should be noted in the above that the ignition timing should preferably be controlled in such a way that the ignition timing, once advanced beyond the MBT, is returned to the MBT gradually, although this is not illustrated in the flow chart of FIG. 2. However, it should also be noted that, if the driveability is not degraded, the advanced ignition timing can immediately be returned so as to enhance the control response and simplify the system configuration.

While the invention has thus been shown and described with reference to specific embodiments, it should be noted that the invention is in no way limited to the details of the described arrangements but changes and modifications may be made without departing from the scope of the appended claims.

What is claimed is:

1. A system for controlling an ignition timing of an internal combustion engine, comprising:

engine operating condition detecting means for detecting operating conditions of the engine including at least an engine speed, an engine load and an engine coolant temperature;

basic ignition timing determining means for determining a basic ignition timing from mapped data prepared based on MBT using the detected engine speed and the engine load;

output ignition timing determining means for determining an output ignition timing based at least on the determined basic ignition timing; and ignition means for igniting an air-fuel mixture in a cylinder of the engine;

wherein the system includes:

advancing correction amount determining means for determining an ignition timing advancing correction based on at least the detected engine coolant temperature; and engine cold start determining means for determining whether the engine is under a predetermined cold starting condition based on the detected operating conditions of the engine; and wherein the output ignition timing determining means determines the output ignition timing beyond the MBT based on the determined ignition timing advancing correction amount, when the engine is under the predetermined cold starting condition, and wherein the advancing correction amount determining means determines the ignition timing advancing correction amount based on the engine coolant temperature, the engine speed and the engine load.

2. A system according to claim 1, wherein the advancing correction amount determining means determines the ignition timing advancing correction amount constant with respect to the engine coolant temperature which varies relative to the engine speed and the engine load such that the ignition timing advancing correction amount basically increases with decreasing engine coolant temperature.

3. A system according to claim 1, wherein the advancing correction amount determining means determines the ignition timing advancing correction amount based on the engine coolant temperature, the engine speed, the engine load and an intake air temperature.

4. A system according to claim 3, wherein the advancing correction amount determining means determines the ignition timing advancing correction amount constant with respect to the engine coolant temperature which varies relative to the engine speed, the engine load and the intake air temperature such that the ignition timing advancing correction amount basically increases with decreasing engine coolant temperature.

5. A method controlling an ignition timing of an internal combustion engine, comprising the steps of:

detecting operating conditions of an engine including at least an engine speed, an engine load and an engine coolant temperature;

determining a basic ignition timing from mapped data prepared based on MBT using the detected engine speed and the engine load;

determining an output ignition timing based at least on the determined basic ignition timing; and igniting an air-fuel mixture in a cylinder of the engine;

wherein the method includes the steps of:

determining an ignition timing advancing correction amount based on at least the detected engine coolant temperature; and determining whether the engine is under a predetermined cold starting condition based on the detected operating conditions of the engine;

and wherein determining the output ignition timing beyond the MBT based on the determined ignition timing advancing correction amount, when the engine is under the predetermined starting condition, and wherein the step of determining the advancing correction amount determines the ignition timing advancing correction amount based on the engine coolant temperature, the engine speed and the engine load.

6. A method according to claim 5, wherein the step of advancing correction amount determining determines the ignition timing advancing correction amount constant with respect to the engine coolant temperature which varies relative to the engine speed and the engine load such that the ignition timing advancing correction amount basically increases with decreasing engine coolant temperature.

7. A method according to claim 5, wherein the step of advancing correction amount determining determines the ignition timing advancing correction amount based on the engine coolant temperature, the engine speed, the engine load and an intake air temperature.

8. A method according to claim 7, wherein the step of advancing correction amount determining determines the ignition timing advancing correction amount constant with respect to the engine coolant temperature which varies relative to the engine speed, the engine load and the intake air temperature such that the ignition timing advancing correction amount basically increases with decreasing engine coolant temperature.

\* \* \* \* \*